(No Model.) 2 Sheets—Sheet 1.
A. CONINGSBY.
DEVICE FOR SECURING TIRES TO WHEEL RIMS.
No. 510,382. Patented Dec. 5, 1893.
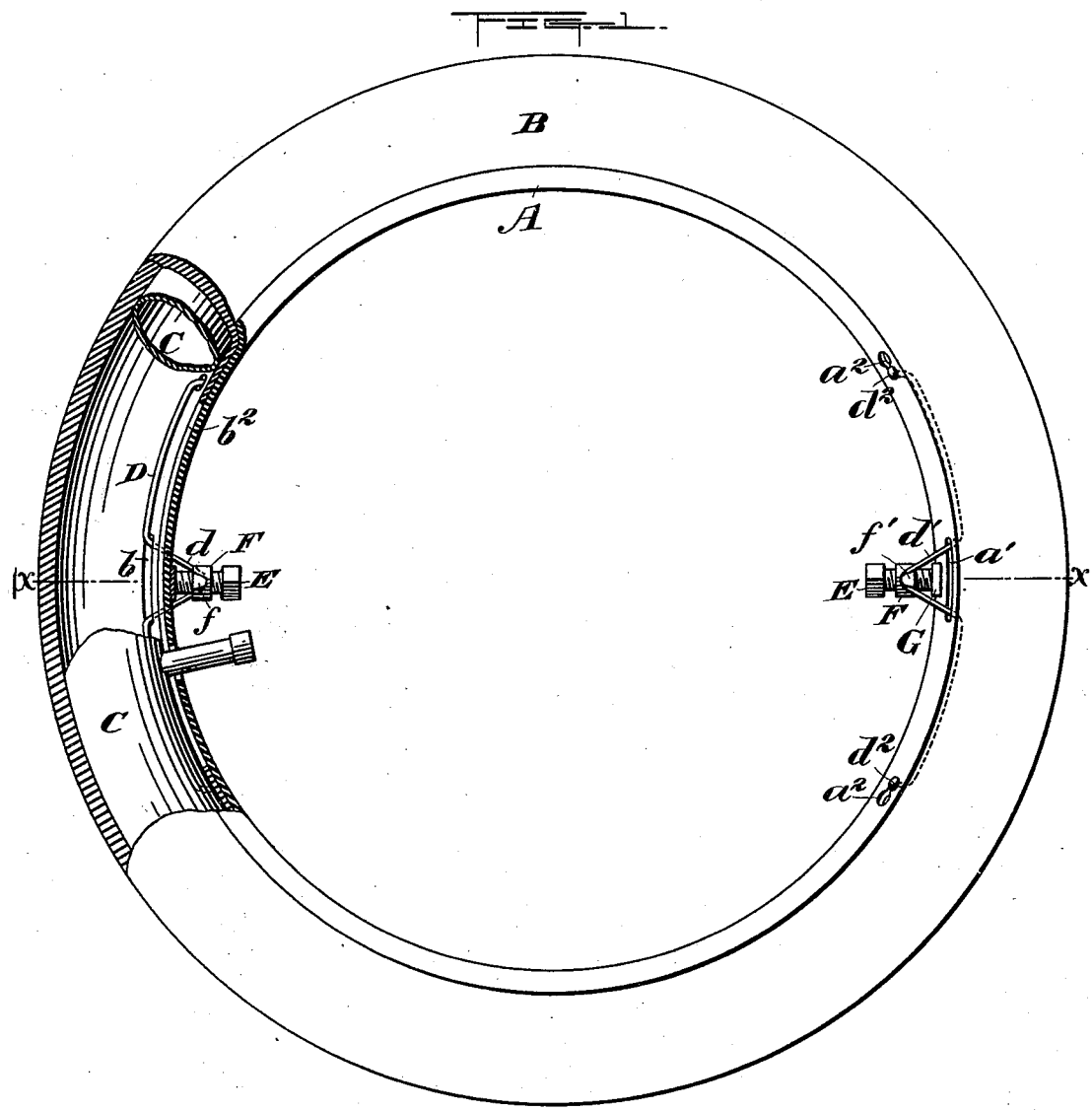
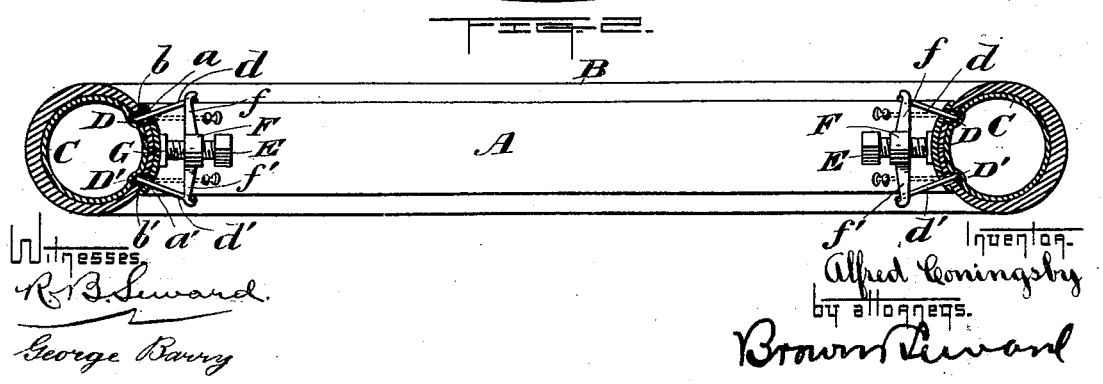

(No Model.) 2 Sheets—Sheet 2.
A. CONINGSBY.
DEVICE FOR SECURING TIRES TO WHEEL RIMS.
No. 510,382. Patented Dec. 5, 1893.
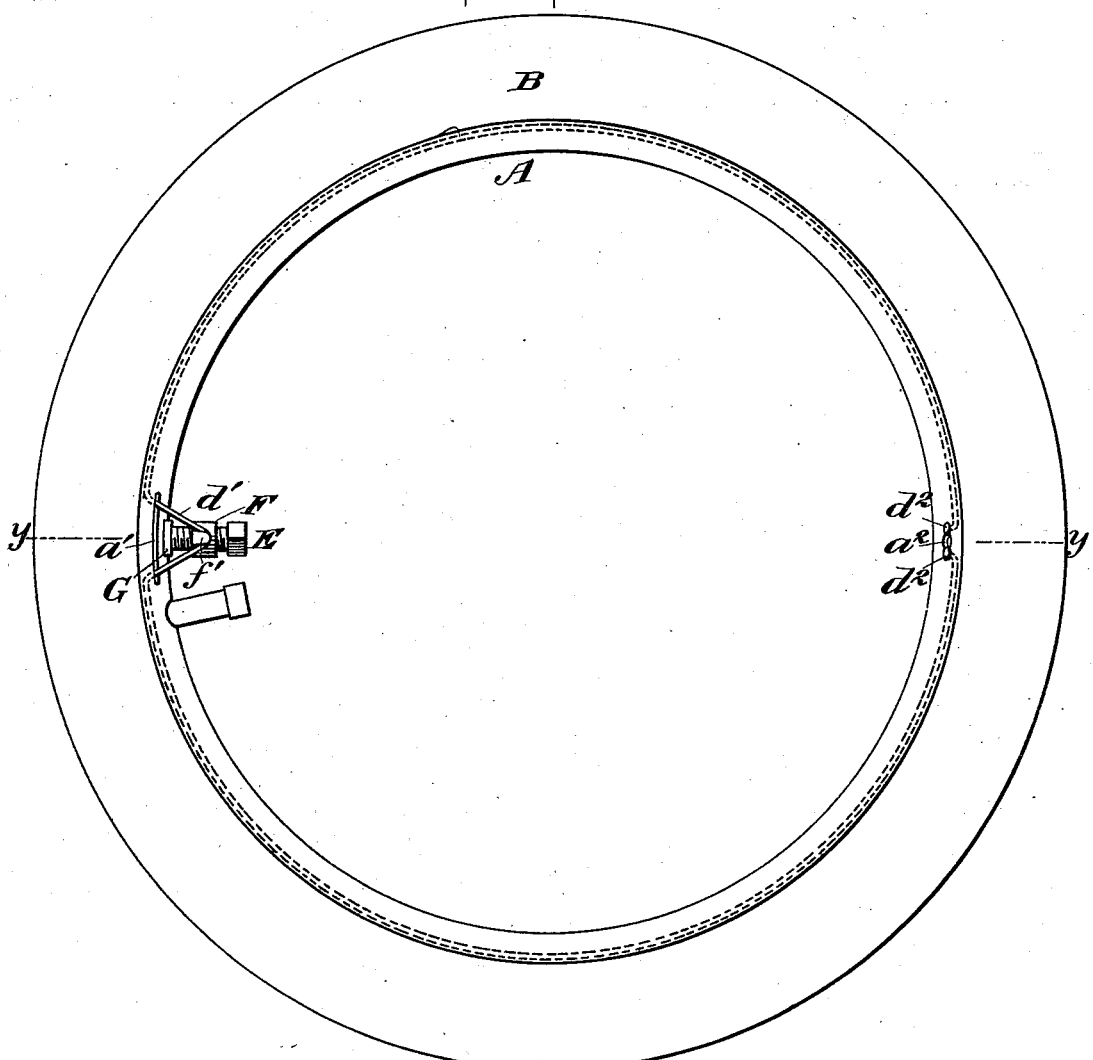
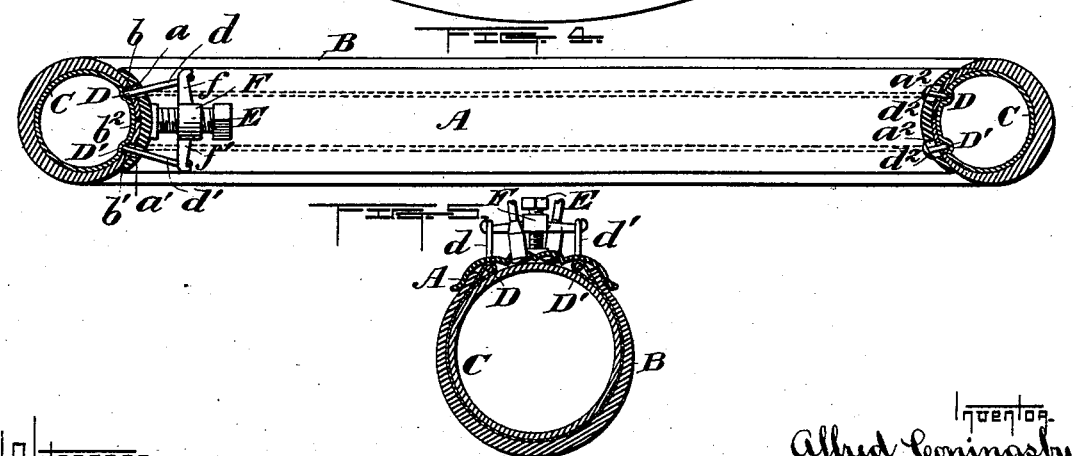

UNITED STATES PATENT OFFICE.

ALFRED CONINGSBY, OF BROOKLYN, NEW YORK, ASSIGNOR TO THE PNEUMATIC TIRE AND CYCLE COMPANY, OF SAME PLACE.

DEVICE FOR SECURING TIRES TO WHEEL-RIMS.

SPECIFICATION forming part of Letters Patent No. 510,382, dated December 5, 1893.

Application filed September 9, 1893. Serial No. 485,137. (No model.)

*To all whom it may concern:*

Be it known that I, ALFRED CONINGSBY, of Brooklyn, in the county of Kings and State of New York, have invented a new and useful Improvement in Devices for Securing Tires to Wheel-Rims, of which the following is a specification.

My invention relates to an improvement in devices for securing tires to wheel rims, one object being to provide a device which will enable the tire to be quickly secured to or removed from the rim and a further object being to provide a device which may be easily applied to the rims and tires now in use without any great changes in construction or any great amount of expense.

A practical embodiment of my invention is represented in the accompanying drawings in which—

Figure 1 is a side view, partially broken away, of a wheel rim and tire, the tire being shown as fastened to the rim by two of my improved securing devices. Fig. 2 is a cross section of the same on the line $x, x$. Fig. 3 is a side view of a wheel rim and tire, the tire in this instance being shown as fastened to the rim by a single securing device. Fig. 4 is a cross section of the same on the line $y, y$, and Fig. 5 is a cross section through a tire and rim, showing the manner of applying my securing device to a tire in which the attaching wires are embedded in the edges of the outer cover or shoe.

A designates the wheel rim.

B is the outer cover or shoe, and C is an inner or air tube of the tire which is secured to the rim A by my improved securing device.

Two attaching or securing wires D, D' extend along the inner wall of the outer shoe B between the shoe and the air tube C. These wires are provided with bent portions $d, d'$ which extend through elongated slots $b, b'$ in the outer cover or shoe and through elongated slots $a, a'$ in the rim A. The ends of the attaching wires extend through the shoe B and through openings $a^2$ in the rim A. The ends of the wires are enlarged to form heads $d^2$ so as to cause the heads $d^2$ to form abutments to prevent the withdrawal of the attaching wires when they are drawn snugly against the inner wall of the shoe.

For the purpose of tightening the attaching wires, I provide a screw bolt E which has a traveling nut F thereon which nut engages the bent portions $d, d'$ so that as the screw bolt is screwed up, the traveling nut is drawn away from the rim A, drawing the bent portions of the attaching wires with it. To do this, I preferably provide the traveling nut with two arms $f, f'$ extending laterally therefrom and provided with slightly enlarged or turned-up ends to retain the bent portions $d, d'$ thereon. A bearing plate G is preferably placed upon the rim A for the screw bolt E to turn upon for the purpose of preventing the bolt E from injuring the rim. I preferably secure the tire in position by means of two of these securing devices but I may use only one, as shown in Figs. 3, 4 and 5, in which case each of the attaching wires preferably extend around the entire circumference of the inner wall of the outer tube and is secured at its ends through a single opening $a^2$ in the rim.

In the tire shown in Fig. 5, the attaching wires are embedded within the edges of the outer cover; but it will be seen that they may be drawn up into position to lock the tire to the rim as well as where the attaching wires are separate from the cover.

When it is desired to secure the tire to the rim, the outer cover or shoe with its inner tube therein is placed along the circumference of the rim and the attaching wires are inserted between the inner wall of the shoe and the exterior wall of the air tube through a suitable slit $b^2$, the ends of the wires being pushed through the openings $a^2$ in the rim and the bent portions $d, d'$ inserted through the elongated slots $b, b'$ in the outer cover and the elongated slots $a, a'$ in the rim. The bent portions are then swung over the arms $f, f'$ of the traveling nut F. The screw bolt E is then screwed up, causing the traveling nut F to recede from the rim, drawing with it the bent portions $d, d'$ and causing the attaching wires to draw the outer cover or shoe snugly against the rim. To release the outer shoe, the screw bolt E is unscrewed, causing the traveling nut F to approach the rim until the bent portions of the attaching wires can be swung out of their engagement with the traveling nut, thereby releasing the attaching wires engagement with the outer covering. The openings $a^2$ in the rim are preferably provided with narrowed extensions so that after the heads of the attaching wires are inserted through the openings, the wires may be drawn up until the heads cannot be withdrawn from the said openings. I may use several of these securing devices along the rim if so desired and will have it understood that slight changes might be resorted to in the construction and arrangement of the several parts without departing from the spirit and scope of my invention, hence I do not wish to limit myself strictly to the construction and arrangement herein set forth, but

What I claim is—

1. The combination with the wheel rim of tire fastening wires extending along the exterior of the rim and provided with bent portions extending inwardly through the rim and a wire tightening device comprising a movable piece engaged with the bent portions of the wires at the inner side of the rim and means for moving the said movable piece away from the inner face of the rim to tighten the wires, substantially as set forth.

2. The combination with the rim of the wheel, of tire fastening wires extending along the outer face of the rim and provided with bent portions extending through the rim and a wire tightening device comprising a traveling nut engaged with the bent portions of the wires at the inner side of the rim and a screw engaged with the nut and having a bearing against the inner face of the rim, substantially as set forth.

ALFRED CONINGSBY.

Witnesses:
FREDK. HAYNES,
C. E. LUNDGREN.